United States Patent
Damola et al.

(10) Patent No.: US 9,003,467 B2
(45) Date of Patent: Apr. 7, 2015

(54) SUPPORTING FUNCTIONS FOR QUALITY-ASSURED P2P VOD SERVICES

(75) Inventors: Ayodele Damola, Solna (SE); András Császár, Budapest (HU); Ákos Kiss, Budapest (HU); Attila Körösi, Budapest (HU); Csaba Lukovszki, Budapest (HU); Balázs Székely, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 878 days.

(21) Appl. No.: 13/123,412

(22) PCT Filed: Oct. 8, 2009

(86) PCT No.: PCT/SE2009/051122
§ 371 (c)(1),
(2), (4) Date: Jul. 29, 2011

(87) PCT Pub. No.: WO2010/042041
PCT Pub. Date: Apr. 15, 2010

(65) Prior Publication Data
US 2011/0277009 A1   Nov. 10, 2011

Related U.S. Application Data

(60) Provisional application No. 61/104,160, filed on Oct. 9, 2008.

(51) Int. Cl.
*H04N 7/173* (2011.01)
*H04N 7/16* (2011.01)
*H04N 21/24* (2011.01)
*H04N 21/63* (2011.01)

(52) U.S. Cl.
CPC ........... *H04N 7/165* (2013.01); *H04N 21/2402* (2013.01); *H04N 21/632* (2013.01)

(58) Field of Classification Search
None
See application file for complete search history.

(56) References Cited

FOREIGN PATENT DOCUMENTS

WO   2007/021725 A2   2/2007
WO   2007/117658 A2   10/2007

OTHER PUBLICATIONS

Small, Tara, et al., On Optimal Peer-To-Peer Topology Construction with Maximum Peer Bandwidth Contributions, 2006, IEEE, 23rd Biennial Symposium on Communications, pp. 157-159.*
International Search Report for PCT/SE2009/051122 mailed Feb. 18, 2010.
International Preliminary Report on Patentability for PCT/SE2009/051122 mailed Feb. 2, 2011.
Small, T., et al., "On Optimal Peer-to-Peer Topology Construction with Maximum Peer Bandwidth Contributions," Communications, 2006, 23rd Biennial Symposium on Communications, IEEE, pp. 157-160.

(Continued)

*Primary Examiner* — Chenea Smith
(74) *Attorney, Agent, or Firm* — Patent Portfolio Builders PLLC

(57) ABSTRACT

The present invention relates to a method for controlling downloading of video segments or segmented video stream to a subscriber client unit, and a subscriber client unit adapted to perform said method. One object of the invention is to guarantee seamless playback and the optimal server load. Said object is by a method and a subscriber client unit that is controlled by a segment selector (SSA) and a server bandwidth control (SBC) algorithm.

24 Claims, 5 Drawing Sheets

(56) References Cited

OTHER PUBLICATIONS

Nguyen, T., et al., "Multiple sender distributed video streaming," IEEE Transactions on Multimedia, vol. 6, No. 2, Apr. 2004, pp. 315-326.

Korosi, A., et al., "High quality P2P-Video-on-Demand with download bandwidth limitation," Quality of Service, 2009 IWQoS, 17th International Workshop, Jul. 13-15, 2009, pp. 1-9.

Wu, J., et al., "Keep Cache Replacement Simple in Peer-Assisted VoD Systems," INFOCOM 2009, IEEE, Apr. 19-25, 2009, pp. 2591-2595.

Korosi, A., et al., "Video-on-Demand Service Provisioning with Peer-to-Peer Set Top Boxes," INFOCOM Paper, Aug. 2008, pp. 1-8.

Tian, Y, et al., "A novel caching mechanism for peer-to-peer based media-on-demand streaming," Journal of Systems Architecture 54, 2008, pp. 55-69.

Liu, S., et al., "Performance Bounds for Peer-Assisted Live Streaming," SIGMETRICS '08, ACM, Jun. 2-6, 2008, Annapolis, Maryland, US, pp. 1-12.

Corrected Written Opinion for PCT/SE2009/051122 mailed Nov. 3, 2010.

* cited by examiner

US 9,003,467 B2

SUPPORTING FUNCTIONS FOR QUALITY-ASSURED P2P VOD SERVICES

TECHNICAL FIELD

The present invention relates to a method for controlling downloading of video segments or segmented video stream to a subscriber client unit, and a subscriber client unit adapted to perform said method.

BACKGROUND

The subject of this invention is a video on demand (VoD) architecture being able to operate or supported in a peer-to-peer manner.

VoD services are attractive since they provide great control to users over when and what to watch: In the VoD service the time elapsed between the staring of the demanded video's playback and the video's demand is necessarily very short. A VoD service should also allow common Video recording and playback operations such as pause, rewind or fast forward.

VoD offerings not only need to provide high reliability and flexibility for the customers but providing VoD services is also challenging in the provider network due to the high bandwidth and real-time playback requirements. Widespread deployment of VoD services, especially providing high-definition video quality threatens with extremely high load during peak hours, especially near the VoD servers where the demands aggregate.

While VoD services gain foothold, one can observe a continuously improving performance in the network segments close to the subscribers from at least two different aspects. Firstly, capacities in the access and aggregation networks are getting higher and higher as optical transmission is moving closer and closer to subscribers. For instance, there are providers already offering Fibre-to-the-Home (FTTH) access to customers. Also new standards (e.g. DSM) will offer high speed access even through twisted pair access. Secondly, one can observe an ever increasing storage capacity in the customer premises as the price-per-bit of hard-drives is decreasing. Customers, therefore, can store several movies, hundreds of images or music files on their disks, be it a PC or a set top box (STB).

Observing these trends it is quite natural to think about how a VoD operator could benefit from the free storage capacity at the customer premises and the potentially free bandwidth in the access and aggregation networks.

The immense success of peer-to-peer (P2P) file sharing in the Internet points out the basic concept of a potential VoD architecture, where the STB of a customer A, having enough storage capacity to store already downloaded movies long after it has been viewed, can upload videos to a customer B if B wants to watch a video that, at least partially, is available in A's storage. Building on such a technique and utilising the unused capacities in the access, the operator can offload its central service node and its backbone network as a decreased amount of content has to be downloaded from the central VoD servers.

As uplink capacities of the customer premises increase, by exploiting the potential of peer-to-peer uploads, more bandwidth can be spared at the backbone. This may result in net gain for the VoD service provider for instance in case of rented transport. Therefore, such models come to be more relevant as high-speed access technologies are getting deployed. It is straightforward to see that as much capacity can be spared at the upper part of the network as much free uplink capacity the peer-to-peer approach can be utilised in the bottom part.

SUMMARY

Therefore, the objective of the present invention to minimise the load of the central video server can be transformed to maximising/engineering the utilisation of the subscribers' free upload and download capacities without quality degradation, i.e., video frames should not be lost or delayed to avoid interruptions during playback.

Said object is achieved by the present invention, which provides a method and a subscriber client unit that regulates from where the segments are downloaded, i.e. from peers or the media server. According to the invention, a Segment Selector Algorithm (SSA) is complemented with a Server Bandwidth Control (SBC) algorithm that computes the minimal required server speed that ensures for a predetermined time period a very low fault probability at the playback of the received video segments.

According to one aspect of the present invention, a method for controlling the downloading of video segments to a subscriber client unit from video segment providers comprising at least one central video server providing video uploading services to a plurality of subscriber clients and at least one subscriber client being a possible and/or accepted uploader client providing video uploading services to other clients in a peer-to-peer manner. A Segment Selector Algorithm for selecting from a list of accepted available video providers a suitable provider for a succeeding video segment to be downloaded, and a Server Bandwidth Control (SBC) algorithm is used, wherein the method is comprising following steps:

Calculating a minimal server bandwidth ($\sigma_{min}$) according to the prebuffered video segment gain in the client unit in order to achieve fault free playback;

Calculating a maximal server bandwidth ($\sigma_{max}$) according to a number of available uploader clients' upload bandwidth in order to avoid competition on the subscriber's access link;

Determining an optimal server bandwidth ($\sigma_{opt}$) according to estimated upload clients' behaviours;

Determining and setting the server speed ($\sigma$) by means of the estimated minimal server bandwidth ($\sigma_{min}$), the maximal server bandwidth ($\sigma_{max}$) and the determined optimal server bandwidth ($\sigma_{opt}$).

According to yet another aspect of the present invention, a subscriber client unit is provided, which is adapted for controlling the downloading of video segments from video segment providers comprising at least one central video server providing video uploading services to a plurality of subscriber clients and at least one subscriber client being a possible and/or accepted uploader client providing video uploading services to other clients in a peer-to-peer manner. The client unit is comprising a controlling unit for executing a Segment Selector Algorithm (SSA) for selecting from a list of accepted available video providers a suitable provider for a succeeding video segment to be downloaded, and a Server Bandwidth Control (SBC) Algorithm. Said subscriber client unit comprises:

a first calculating unit to calculate a minimal server bandwidth ($\sigma_{min}$) according to the prebuffered video segment gain in the client unit in order to achieve fault free playback;

a second calculating unit to calculate a maximal server bandwidth ($\sigma_{max}$) according to a number of available uploader clients' upload bandwidth in order to avoid competition on the subscriber's access link;

a first determining unit to determine an optimal server bandwidth ($\sigma_{opt}$) according to estimated upload clients' behaviours, and;

a second determining unit to determine and set the server speed ($\sigma$) by means of the estimated minimal server bandwidth ($\sigma_{min}$), the maximal server bandwidth ($\sigma_{max}$) and the determined optimal server bandwidth ($\sigma_{opt}$).

Different embodiments of the method and subscriber client unit is provided in the enclosed dependent claims.

The method and device according to the invention is used for controlling different aspects, features and parameters/variables, e.g. the server speed, of the download of video segments One advantage of the present invention is that it offers fault free playback and optimal server load.

Another advantage with the present invention is that it spares server bandwidth without quality of service degradation. A true VoD type service is provided, where video recording and playback actions may be performed with very small delay experienced by the customers. To spare bandwidth storage capacities of customer Subscriber Client Units (SCUs), e.g. a Set-Top Box, Residental Gateway, etc., and their free upload bandwidth are utilized.

Yet another advantage is that it spares the central server bandwidth in a VoD provider network utilizing stored videos at the customers SCUs and the free uplink capacities in the access and aggregation networks while keeping the quality of the offered service unchangeable. Additionally, the download bandwidth remains controllable at the downloading SCUs downlink.

Further one advantage the present invention is that provides an optimal peer allocation, optimal segment selection architecture, algorithms, that utilize the available storage capacities at the customers and frees uplink capacities in the access and aggregation networks reducing the central server load, while quality of the service is assured.

In addition, another advantage of the invention is that the provided segment selector (SSA) and server bandwidth control (SBC) algorithms guarantees seamless playback, the optimal server load and controllable upload and download speed at uploading and downloading SCUs, respectively.

Further another advantage is that the present invention decreases not just the aggregated server load, but the peak of the server load is under control.

Moreover, another advantage with the present invention is that the necessary communication is decreased between the clients and less storage space is required at the tracker where lightweight signalling could be implemented between clients and central management.

Finally, yet another advantage is that the present invention maximizes the storage potential at the customer SCUs with respect to the service provisioning efficiency.

BRIEF DESCRIPTION OF THE DRAWINGS

Different embodiments of the present invention will now be described and discussed in more detail hereinafter with reference to the following submitted drawings:

FIG. 2b is a flowchart illustrating in more detail the SCU operation during segment download, step 30, of the flowchart in FIG. 2a.

DETAILED DESCRIPTION

The present invention relates to a method for controlling downloading of video segments to a subscriber client unit, and a subscriber client unit adapted to perform said method.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced and other embodiments that depart from these specific details. In other instances, detailed descriptions of well known methods, devices, and circuits are omitted so as not to obscure the description of the present invention with unnecessary detail.

Figure 1:
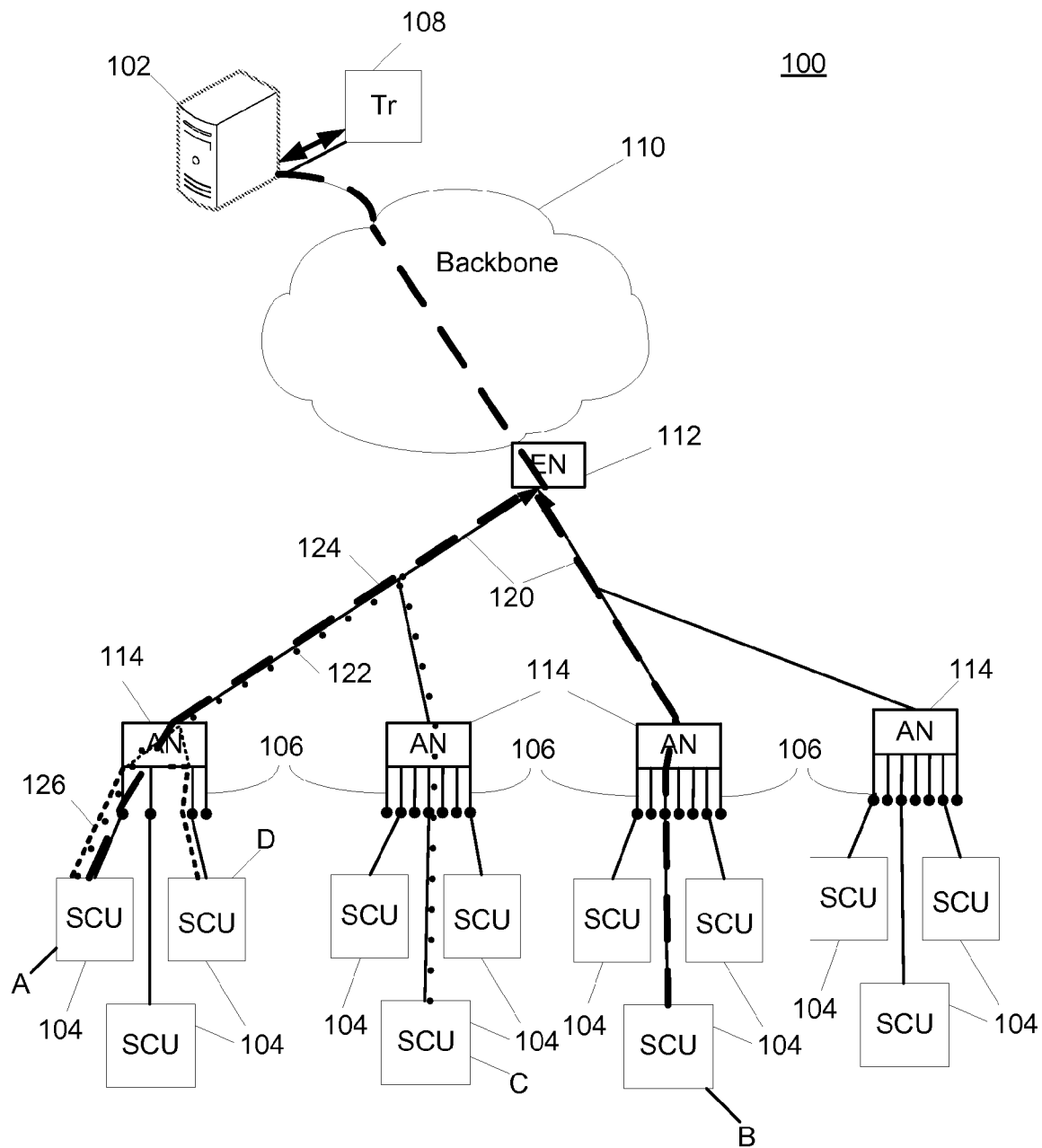
FIG. 1 is a block diagram schematically showing a VoD architecture according to the invention.

FIG. 1 is a block diagram schematically showing a VoD architecture 100 and its main components: the central video server 102 storing all the offered videos; clients having a subscriber client unit (SCU) 104, i.e., the set-top-boxes or residential gateways needed to access the service; access nodes 114 to which clients are connected by access links 106 such as DSL (digital subscriber line); the aggregation network 120 which often has a tree like structure; and the edge nodes 112 on the border of provider core network 110. In a high level, such an architecture is well-known in the prior art.

The media server 102 has all segments from all videos, and it can upload any segment any time, and it can stream the video segment with any bitrate determined by the client. Additionally, it can upload tablets from different simple central calculations (for example simple simulations). These tablets give the optimal server bandwidth $\sigma_{opt}$ according the estimated uploader behaviors.

A tracker 108 collects the information of the actual client service requests which tracks which client is requested (and actually under play-back) which movie. The tracker stores also the unassociated uploader clients with free upload capacities.

The SCU 104, e.g. a Set-Top Box (STB) applies local storage deletion policy and it is a client to the tracker. Each SCU monitors the segments upload time, can estimate upload parameters (for example maximal bandwidth) from the observed data. Additionally, acting as a peer it can store and send the segment or segment state requested by downloading client. It runs segment selector and bandwidth control algorithms. As a downloader, the long-range connections with the uploader clients is allowed. The SCU 104 implements a storage policy that determines which segment to delete in case of storage capacity overfill. A conceptual means to regulate the download process is the "gain". The SCU, when playing a video, has a gain if it has a few segments already downloaded in a buffer that will be played only later. Now, if the gain is zero, it means that the segments are played back, the SCU does not yet has the next segment that should be played back just after the current segment finishes. Obviously, this is not good, as it is not good either if gain is negative. The goal is to have the gain positive, albeit not very big.

A SCU 104 comprises a programmable control unit for controlling and monitoring different functions of the SCU, e.g. communication with other entities in the network, Video playback, calculations, estimations, determinations, etc. Said control unit may be a microprocessor, Central Processing Unit (CPU), Personal Computer, etc. The SCU 104 is therefore capable of running different algorithms.

The idea is that the SCU regulates the speed between the SCU and the server. How this is done is out of the scope of the present invention. However, a few alternatives to achieve a server speed control is could be suggested:

In case of non-flow-controlled traffic (e.g. UDP-based), the SCU is designed to send an explicit control message telling the value of sigma to the server, so that the server generates the packet with that rate. If UDP/RTP is used for transmitting a stream, then the RTCP control protocol can be actually used to give feedback to the sender on the rate with which it should send traffic;

In case of flow-controlled transmission, e.g. TCP-based, the client has force the determined sigma by acknowledging the packets so that the throughput will correspond to sigma.

A SCU 104 according to the invention comprises both a Segment Selector Algorithm (SSA) and a Server Bandwidth Control (SBC). The main steps of said two algorithms are described in the following.

The SSA has the responsibility that every segment arrives until its playback time. The SCUs typically can't upload at the bitrate of a movie and that is why they upload segments which will be played later. The SSA therefore controls that if one client can't upload the segment on time, the server finishes uploading the segment and the client starts to upload another segment.

The purpose of the SBC is to regulate download bandwidth from the server. The SBC calculates a minimal server bandwidth according to the prebuffered gain in order to achieve fault free playback. It calculates a maximal bandwidth according to the SCU's upload bandwidth in order to avoid the competition in the customer downlink. It reads out the optimal server bandwidth (between calculated bounds) from the above-mentioned tablets considering the measure of the gain and targeted fault probability. It affects that as the measure of the gain increases the necessary server bandwidth decreases.

There are, however, several factors to consider when designing an efficient client supported VoD distribution system, such as:

The downlink bandwidth reserved for the video service at the subscriber's access link. More bandwidth naturally allows relying on more peers.

The varying throughput between a pair of uploader and downloader clients. This is the result of multiple factors.

Variation of the free uplink capacity of the subscriber's access link 106. Video uploads may have a dedicated logical channel with fixed reserved bandwidth. On the other hand, the uplink may be shared with other services (e.g., Internet access) in which case it could use only as much bandwidth as the other subscribed services leave free meaning a constantly changing upload capacity for VoD. In addition, a nominal constant uplink capacity may as well fluctuate due to phenomena in the physical layer. In practice, a hybrid approach is possible as well: for example, the Internet access subscription reserves only part of the free capacity of the uplink, leaving the remaining free capacity dedicated to the video uploads but video uploads could also borrow bandwidth from the Internet subscription when it is not used to its full extent.

The free transport network capacity between the two clients may vary. Today's access networks, for example utilising techniques like MAC Forced Forwarding, divert traffic between two subscribers high up to a network node capable of performing charging and policing. This essentially makes the transport path longer, theoretically increasing the chance of congestion.

The video segment size. Like 'chunks' in traditional P2P file sharing systems, there is a smallest unit, hereafter called a video segment, the distribution of which the network architecture takes care of. The size of this segment may span from a few video frames to several seconds of the video. The smaller the segment size, the more control events the system must process but the finer granularity it offers.

The prebuffered gain. A common technique is to have the SCU 104 to prebuffer some amount of the video stream, i.e. to gather a gain, so that during playback it is resilient against transport impairments like packet losses or against unreliable data sources. Consequently, higher gain is more suitable if the system relies on client uploads more extensively. On the other hand, allowing video recording and playback operations, e.g. fast forward, speaks for a small gain, as during a fast forward the prebuffered gain is essentially lost.

Storage policy in the SCU. The storage capacity of an SCU, be it any high, is finite. That is, sooner or later the system has to select which segments a given SCU should keep and which it can delete.

As peers now have multiple not fully reliable sources (src) to download the video segments from, an important question is when to download which segment from where considering all the previous constraints and inputs.

The operation of the system in FIG. 1 is hereafter explained with the help of an example. It is assumed that a Subscriber Client Unit A initiates the playback of a video, e.g. a movie, from the system. In FIG. 1, client A is the downloading client, while clients B, C and D are possible and/or allowed uploader clients storing the whole requested movie or parts of the movie. The communication paths for the streaming video and message communications between the different entities, the central video server included, are illustrated as follows:

communication paths 122 between client A, client B and central video server are illustrated with a broad and long dashed line;

communication paths 124 between client A, client C and central video server are illustrated with dotted line (but to decrease the number of obvious details in the drawing, the part of the communication path 124 between the server and said clients is deliberately not illustrated as a corresponding path 122 is illustrated);

communication paths 126 between client A, client D and central video server is illustrated with a thin and short dashed line (but to decrease the number of obvious details in the drawing, the part of the communication path 126 between the server and said clients is deliberately not illustrated as a corresponding path 122 is illustrated);

Initially, the central video server 102 immediately starts streaming the first video segments at the bitrate of the video playback rate. Additionally, client A registers its request to the logical entity called the tracker 108, which stores and scores which video is requested by which client. When A finishes the playback this entry is deleted from the tracker.

In parallel to that, once a Subscriber Client unit B has a free upload slot, it initiates a search to the tracker 108 for a downloading client who wants to download a movie it possesses. A potential uploader, B in this example, could seek for a downloading client using a simple query containing the list of its available videos. The tracker 108 also stores a reference to unassociated uploader clients 104, such as clients C and D, for fast association in case a new downloader appears.

Once a downloader client A is associated to the uploader client B, the downloader client controls which segment to transmit, and the downloader terminates the association once it is not needed any longer or if the uploader has no more required segments. The client A applies SSA and SBC algorithms, while it also applies the storage deletion policy in advance of new video download. Uploader clients, such as C and D, may upload to the downloader client A utilising the remaining downlink bandwidth at the downloader. This results in a download speed higher than the movie bitrate, which can be used to accumulate some prebuffered segments in advance of the position of the playback.

Additionally, tracker 108 mechanisms will here be described where uploader C with free capacity seeks for downloader clients. If the tracker 108 has associated downloader A and uploader C, C sends availability to A. Downloader A may accept or reject C to be a uploader. If C is rejected, A notifies the tracker 108, and asks for another downloader, and a loop is established. If downloader A accepts C, A requests segment from C after t_C (see FIG. 4). Client C then offers the next segment s. The SCU checks weather s is missing in the buffer storage and therefore wanted. If s is wanted, C uploads s to A. If s is rejected, A requests C for a new segment s. In the next situation, downloader A drops the uploader C, which triggers A to stop uploading. Uploader A notifies the tracker 108, and asks for another downloader. The tracker 108 then responses with a possible client D. In a third situation, downloader A stops an uploading from the uploader C, and repeats the process described above for accepting or rejecting a new offered downloader client D. If D is accepted, A starts the uploading from D.

Note the two different roles of the central server. First, it is the one starting the video upload initially. In addition, the server having all segments of all movies available can continue the upload of any segments that were not fully downloaded from a peer due to being interrupted. Hence, its main, second, role is backing the download process, such that when a video segment can not be downloaded from the associated clients then it is downloaded from the central media server.

Before presenting the control method according to the invention, some notions of special interest has to be explained:

$V_{max}$ is the downlink bandwidth reserved for the video service at the subscriber's access link,
$\sigma$ is the server upload bandwidth to a customer,
rho is the bitrate of the movie,
t_play is the state of the play in the movie,
t_C is the size of the time window after the client can upload in the SSA,
t_S is the size of the time window after the server finish every segment upload in SSA,
$\sigma_{min}$ is the lower bound of the server bandwidth,
$\sigma_{max}$ is the upper bound of the server bandwidth,
$\sigma_{opt}$ is the optimal server bandwidth according the previous simulation results,
u is the client upload bandwidth For resource management purposes, it is assumed that a fixed maximal downlink bandwidth is reserved for the video service and it is also supposed that the uplink capacities of the clients, which can be used to upload videos for neighbouring clients, are stochastic processes, i.e. they are varying in time.

The present invention provides a method for controlling the downloading of video segments to a subscriber client unit 300 from video segment providers. Said providers comprise at least one video server centre 102 providing video uploading services to a plurality of is illustrated subscriber clients 104. At least one subscriber client being a possible uploader client provides video uploading services to other clients in a peer-to-peer manner.

Figure 2A:
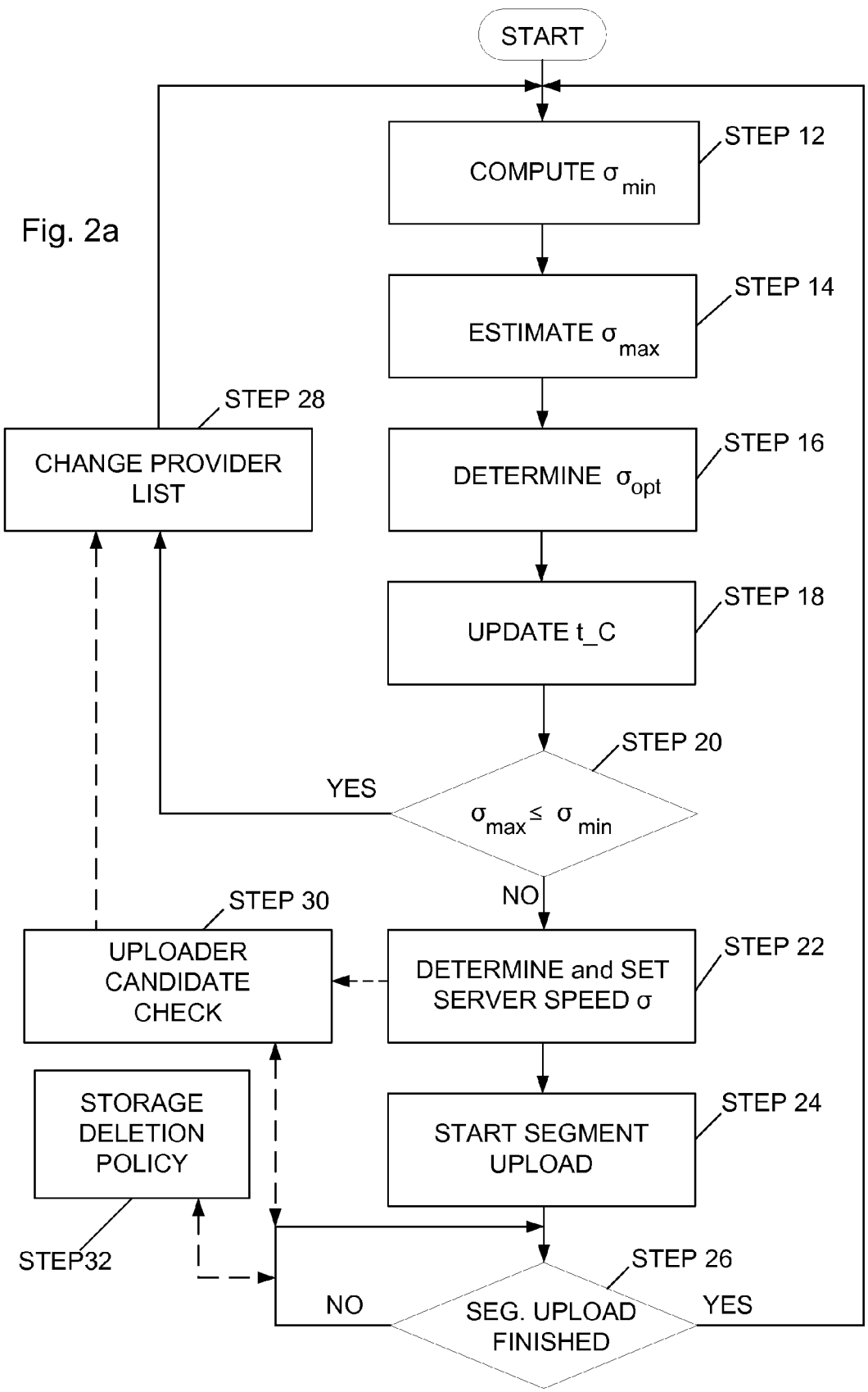
FIG. 2a is a flowchart illustrating the method according to the invention.

FIG. 2a is a flowchart illustrating said method according to the invention wherein the SCU is in its downloader role.

The Subscriber Client Unit (SCU) is capable of executing a Segment Selector Algorithm (SSA) for selecting from a list of accepted available video providers a suitable provider for a succeeding video segment to be downloaded. The SSA chooses the most appropriate segments to download from either one of the associated uploader clients or from the central video server. Further, said invented control method involves a Server Bandwidth Control (SBC) algorithm. The SBC algorithm controls the server download bandwidth as a function of client upload behaviors and the actual pre-buffered gain. Thus, in a first step of the SBC algorithm, the SCU computes a minimal server bandwidth ($\sigma_{min}$) according to the prebuffered video segment gain in the client unit in order to achieve fault free playback, step 12. The minimal server bandwidth ($\sigma_{min}$) speed is calculated, e.g. by means of the equation $$\sigma_{min} = \max_{time_i \leq t_c} \left\{ \frac{gap1 + \ldots gapi}{time_i} \right\}.$$

The parameters timei and gapi is explained in detail with reference to FIG. 5, and the section "Lower bound algorithm" further down in the present description.

In the next step, step 14, the SCU estimates a maximal server bandwidth ($\sigma_{max}$) according to the number of available uploader clients' total upload bandwidth/speed in order to avoid competition on the subscriber's access link. The maximal server bandwidth ($\sigma_{max}$) is calculated by means of the equation $$\sigma_{max} = V_{max} - \Sigma \text{estimated\_maximal\_uploadspeed}$$

wherein $V_{max}$ is the downlink bandwidth reserved for the video service at the subscriber's access link (106 in FIG. 1).

Thereafter, in step 16, the SCU determines an optimal server bandwidth ($\sigma_{opt}$) according to estimated upload clients' behaviours. The optimal server bandwidth ($\sigma_{opt}$) is determined by means of a suitable optimal server speed algorithm. Thereafter, step 18, the SCU updates the parameter t_C, which is the time offset after which a segment download can start from another client, based on the estimated upload of a segment, the estimation being performed based on a preset number of recent completely finished video segment uploads. It is now possible, in step 20, to determine by means of the estimated minimal server bandwidth ($\sigma_{min}$) and the maximal server bandwidth ($\sigma_{max}$) whether the list of accepted available video providers should be changed, or not. If the condition $$\sigma_{max} \leq \sigma_{min}$$

is fulfilled.

If said condition is fulfilled, "yes", the invented control method continuous to step, step 28, wherein the list of accepted available video providers in the SCU is changed by dropping one of the accepted available uploader clients, and the steps 12 to 18 are executed again for the new amended list of video providers. The lope containing steps 12-18 and 28 is repeated until the condition in step 20 is not valid any longer.

When the condition in step 20 is not valid any longer, the SCU determines and sets the server speed (σ), step 22, by means of the estimated minimal server bandwidth ($\sigma_{min}$), the maximal server bandwidth ($\sigma_{max}$) and the determined optimal server bandwidth ($\sigma_{opt}$). The server speed (σ) is determined and set by solving the equation $$\sigma=\min\{\max\{\sigma_{min},\sigma_{opt}\},\sigma_{max}\}.$$

The segment upload is now started by the SCU that is using the set server speed during the upload of the segment. The segment upload is running as long as the requirement "segment upload finished?" is not valid ("NO"), step 26. When the segment upload is finished said requirement is valid and the control method restarts, step 12.

Further, during the running of the segment uploading, the SCU is able to Check new uploader candidates that the SCU have been notified is available. The SCU is informed about the uploading speed ($\sigma_{new}$) of the new available uploader client. In step 30, for each new uploader candidate, the SCU compares the difference between the maximal server bandwidth ($\sigma_{max}$) and the determined server speed (σ) with the uploading speed of the uploader client candidate to determine whether the uploader client candidate is acceptable, or not. The uploader client candidate is determined to be acceptable if the condition $$\sigma_{max}-\sigma\geq\sigma_{new}$$

is fulfilled. The tracker is then notified by the SCU that a new uploader can be accepted. In other case, the uploader candidate is determined to be not acceptable.

Further, in one embodiment of the method according to the invention, a storage deletion policy process, step 32, is executed during the downloading process. In said storage policy process segments are deleted from a stored video file, e.g. a movie, so that there still remain segments from the file or movie scattered in a uniform manner throughout the file/movie if a data storage is running out of enough storage to be able to store the whole movie to be downloaded. The policy is described in more detail further down of the description, see section "Storage policy". Said policy may be started and executed any time during the downloading of segments to avoid overflow.

Figure 2B:
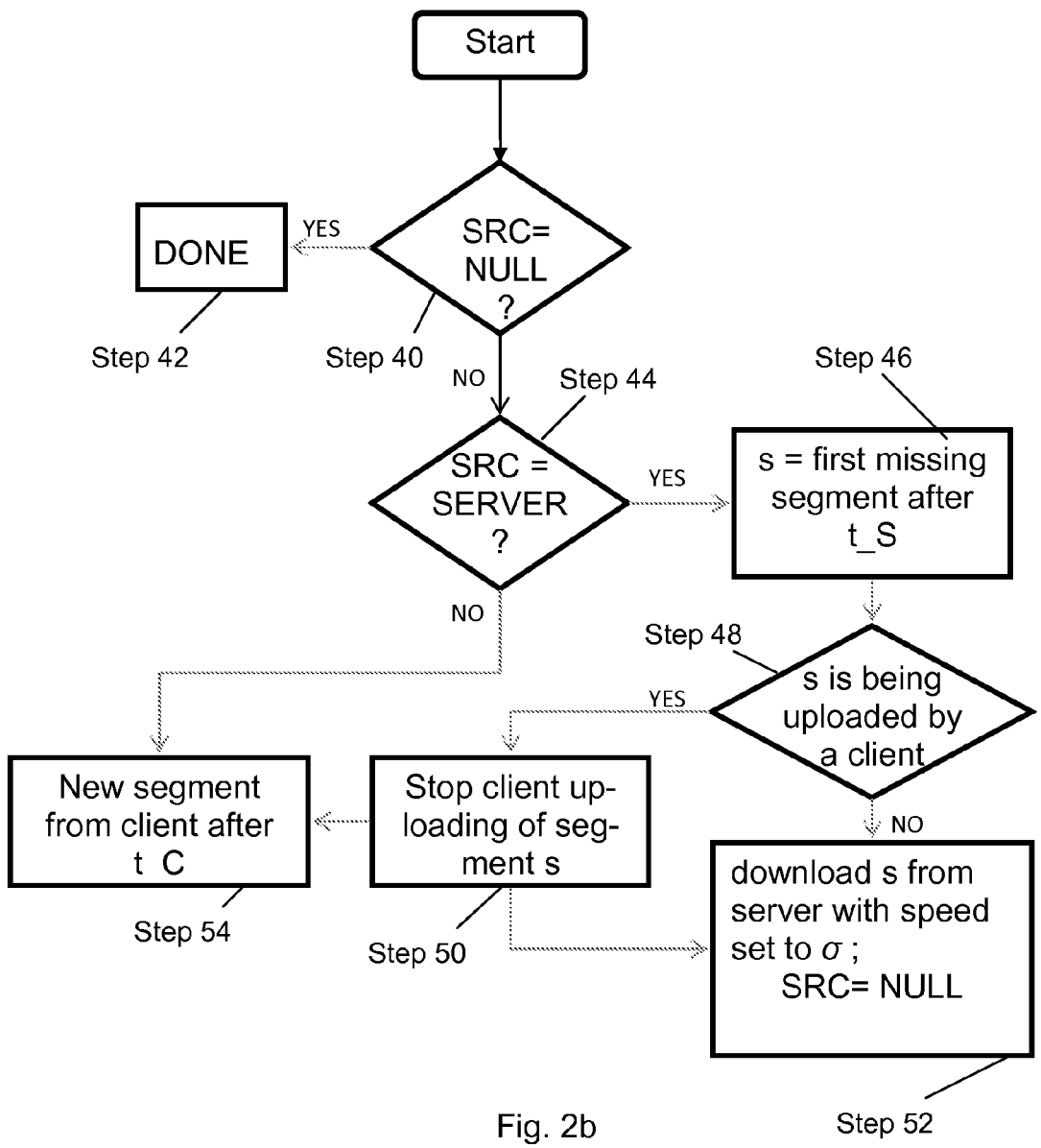

FIG. 2b is a flowchart illustrating in more detail the SCU operation during segment download, step 30, of the above described flowchart.

If there is no uploading source connected to the SCU in the test of step 40, src=NULL, the segment download is finished and the process stops in step 42.

If the download is not done, it is tested in step 44 whether the SCU is either connected to a central video server, src=server, or another SCU acting as an uploading server, src=client.id. When a central server is the uploading source, the first missing segment s after t_S is uploaded, in step 46. It is tested, in test step 48, if the uploader is a client or a central server. If the uploader is a client, the client uploading of said segment s is stopped in step 50, and replaced by the downloading of the segment s from the central server at the set server speed σ, in step 52. If segment s is downloaded by the central server, the server speed is set to σ, step 52. When the client uploading of segment s is stopped, a new segment from the client after t_C is requested and downloaded in step 54.

If an SCU is acting as an uploading server, according to test step 44, src=client.id, a new segment after t_C from said SCU is downloaded in step 54.

A number of events have the possibility to start up the SBC algorithm. Said events are:
Finish playing a segment;
Video recording and playback (VCR) operation;
Server has finished upload;
Client source has finished upload;
Said four events initiate an update process of the list of prebuffered segments, i.e. the gain, before the SBC algorithm is performed. Further, the "Client source has finished upload"—event triggers also an estimation of client source's speed.

Another event that triggers the SBC algorithm is when a new uploader is available. The SBC runs the test $$\sigma_{max}-\sigma\geq\sigma_{new}$$

and if said condition is valid, the uploader candidate is accepted and the new uploader SCU is selected as a video source. Thus, the acceptance of a new uploader starts the SBC algorithm.

The SCU in its downloader role has been described above. Additionally, as understood by the description above, the SCU may operate as an uploader. It will now be described how the SCU will operate due to the prevailing situation.

Figure 3:
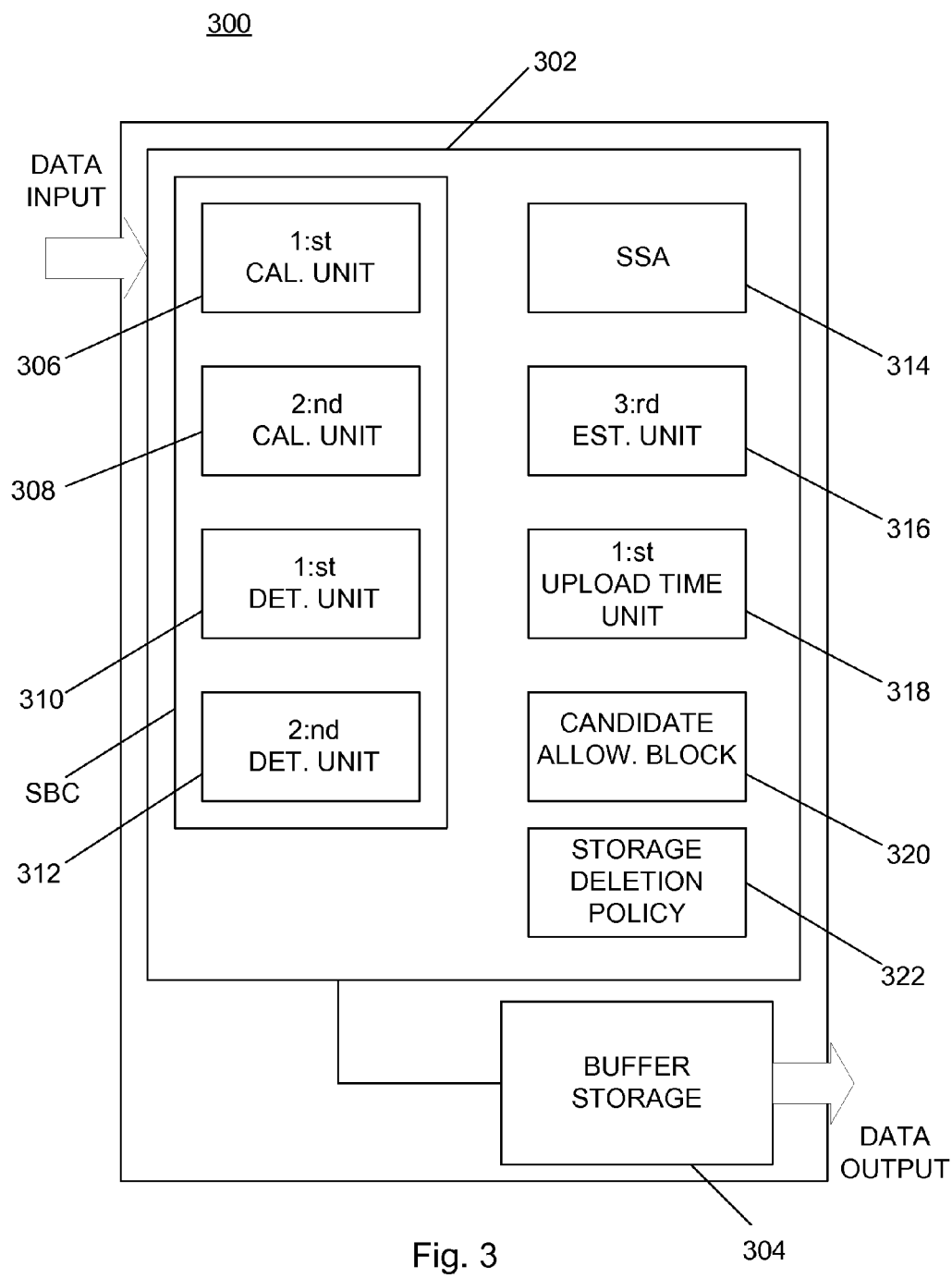
FIG. 3 is a block diagram illustrating schematically an embodiment of a subscriber client unit (SCU) according to the invention

FIG. 3 is an embodiment of a subscriber client unit (SCU) according to the invention for enabling the above described method. The SCU could be a Set-Top box (STB), a residential gateway, a Personal Computer or similar video handling device. The SCU 300 is adapted for controlling the downloading of video segments from video segment providers, such as video server centers or other subscriber clients being possible and/or accepted/allowed uploader clients providing video uploading services to other clients in a peer-to-peer manner. The SCU 300 is therefore provided with a programmable control unit 302 for controlling and monitoring different functions of the SCU, e.g. communication with other entities in different nodes of the network, Video playback, calculations, estimations, determinations, etc. Said control unit may be a microprocessor, Central Processing Unit (CPU), Personal Computer, etc. The SCU 300 is therefore capable of running different algorithms.

The SCU 300 is comprising a controlling unit 302 for controlling a Segment Selector Algorithm (SSA) block 314 for selecting from a list of accepted available video providers (102,104 in FIG. 1) a suitable provider for a succeeding video segment to be downloaded. Further, the SCU comprises a Server Bandwidth Control (SBC) Algorithm block SBC for operating said SBC Algorithm. The controlling unit 302 is further controlling a first calculating means 306 to calculate a minimal server bandwidth ($\sigma_{min}$) according to the prebuffered video segment gain in the SCU 300 in order to achieve fault free playback, a second calculating unit 308 to calculate a maximal server bandwidth ($\sigma_{max}$) according to a number of available uploader clients' upload bandwidth in order to avoid competition on the subscriber's access link.

Further, the SCU 300 is provided with a first determining unit 310 to determine an optimal server bandwidth ($\sigma_{opt}$) according to estimated upload clients' behaviours, and a second determining unit 312 to determine and set the server speed (σ) by means of the estimated minimal server bandwidth ($\sigma_{min}$), the maximal server bandwidth ($\sigma_{max}$) and the determined optimal server bandwidth ($\sigma_{opt}$).

The second determining unit 312 is therefore comprising estimating means adapted to estimate the server speed by means of the equation $$\sigma=\min\{\max\{\sigma_{min},\sigma_{opt}\},\sigma_{max}\}.$$

The first determining unit 310 executes a suitable optimal server speed algorithm to set the optimal server bandwidth ($\sigma_{opt}$).

According to one embodiment, the first calculating unit (306) is adapted to execute the equation $$\sigma_{min} = \max_{time_i \leq t_c} \left\{ \frac{gap1 + \ldots gapi}{time_i} \right\}.$$

for calculating the minimal server bandwidth ($\sigma_{min}$) speed. The parameters timei and gapi is explained in detail with reference to FIG. 5, and the section "Lower bound algorithm" further down in the present description.

The second calculating unit (308) is adapted to execute the equation $$\sigma_{max} = V_{max} - \Sigma \text{estimated\_maximal\_uploadspeed}$$

wherein Vmax is the downlink bandwidth reserved for the video service at the subscriber's access link (106 in FIG. 1) and the sum is the total bandwidth/speed of available uploader clients' upload bandwidth/speeds.

The SCU 300 also comprises a third determining unit 316 adapted to determine whether the list of accepted available video providers (102,104 in FIG. 1) should be changed, or not, by means of the estimated minimal server bandwidth ($\sigma_{min}$), and the maximal server bandwidth ($\sigma_{max}$). The available video providers is determined to be changed by dropping an accepted available uploader client if the condition $$\sigma_{max} \leq \sigma_{min}$$

is fulfilled.

The SCU 300 is also provided with a first upload time unit 318 that is adapted to update the parameter t_C, which is the time offset after which a segment download can start from another client, based on the estimated upload of a segment. The estimation is performed based on a preset number of recent completely finished video segment uploads.

Further, the subscriber client unit 300 may comprise a candidate allowance block 320 adapted for comparing the uploading speed ($\sigma_{new}$) of a new available uploader client with the difference between the maximal server bandwidth ($\sigma_{max}$) and the determined server speed ($\sigma$) to determine whether the uploader client candidate is acceptable, or not. In one embodiment of The SCU 300, the uploader client candidate is determined to be acceptable if the condition $$\sigma_{max} - \sigma \leq (\sigma_{new})$$

is fulfilled.

Further, in one embodiment of the SCU 300 according to the invention, the SCU 300 is provided with a storage deletion policy block 322. Said storage policy block deletes segments from a movie so that there still remain segments from the movie scattered in a uniform manner throughout the movie if the data storage 304 is running out of enough storage to be able to store the whole movie to be downloaded. The policy is described in more detail further down of the description, see section "Storage policy".

The function of the invented SCU 300 and its embodiments and the invented method will be explained in more detail hereafter.

The SCU is also provided with an data input for receiving the video segment stream. It also comprises a buffer storage 304 for buffering a gain of video segments. A data output is also provided for feeding video segments to a rendering device or other devices handling video segments. The SCU 300 may comprise a plurality of other functional blocks and units, such as signaling means for communicating with other devices connected to the SCU, video decoders, etc. However, said other functional blocks and units are considered as well-known in the prior art, and they are therefore not further described in the description or illustrated in the drawings.

The present invention ensures that subscribers never download faster than the bitrate of the movie from the media server. It also ensures that the present invention does not use more server bandwidth than a unicast solution Although the aggregated download bandwidth of the server and uploader clients may exceed the bitrate of the video during short time intervals the aggregated speed remains always under the download limit defined by the operator. More, the average aggregated speed is the bitrate of the video. If the aggregated speed is higher than the bitrate of the video the prebuffered gain increases. If the amount of the gain reaches a certain level then less server bandwidth is enough to balance the unreliability (randomness) of the client uploads. The SBC sets a lower server bandwidth, hence one can spare with the required server speed and frees download capacities for download from associated clients. Utilizing the free capacity on the uplinks of customers, one can not disregard the fluctuation of their upload speeds. If the upload speed of an uploader client is slower than expected then the segment being uploaded arrives later than expected. This may cause error in the playback. In these cases the SSA downloads this segment from the server and asks a new segment from the associated uploader client. If the client's upload speed is faster than expected then that may cause competition at the downloader client's downlink. Avoiding this competition SBC decreases the required server speed or releases an uploader.

In order to best estimate the uploader bandwidths we propose a long-lasting uploader-downloader relationship: the uploader uploads to the customer as long as the customer needs. Consequently, the uploader client association is uploader driven, but the admittance and kick-of policy is determined by the downloader client.

In order to ensure long-lasting connection between the uploaders and downloaders, the uploaders must have enough segments from the movie and the segments have to be placed quasi-uniform (big gaps are not allowed) so that the uploader always has useful segments which are needed by the downloader.

The uploader client uploads to the downloader as long as the downloader needs the uploader. Hence we get the best estimation of the uploaders' behaviour. Additionally, the downloader client only needs to select segments from the libraries of the associated clients, hence the complexity and the administrative communication per video segment is relatively small.

Segment Selector Algorithm

The Segment Selector Algorithm handled by block 314 is responsible for selecting the next segments to download from the server and from the clients. Both server segments and client segments are small pieces of the requested video with predefined size. The selection of next segment to download is managed with a simple but efficient sliding window algorithm.

Figure 4:
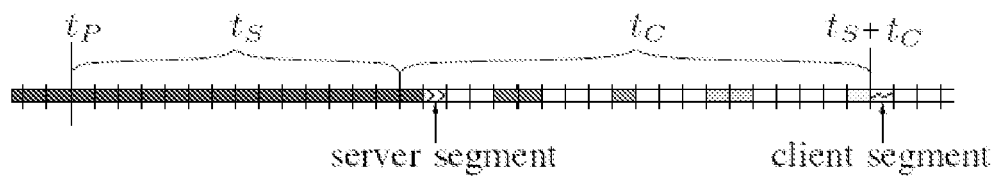
FIG. 4 is illustrating a time axis comprising existing and missing video segments in time order of a video session, such as a movie, in the buffer storage.

With reference to FIG. 4, a description of the sliding-window algorithm and its two parameters t_C and t_S will be discussed. FIG. 4 comprises a time axis illustrating existing and missing video segments, i.e. gaps, in time order of a video session, such as a movie, in the buffer storage.

The basic rule of the segment selection is that counting from the moment of play-back a segment could be downloaded from clients if it is further than a time parameter t_S+t_C ($t_s$+$t_c$ in FIG. 4) and it is not under download. Before that position download is only allowed from the central server. By letting clients upload only distant segments, the unreliability of the client uploads can be balanced. Further, it may happen that a download from a client does not finish until the segment being downloaded should be played back. To overcome this issue, if a client does not finish its upload until t_S then the downloader client interrupts the slow uploaders and requests a new distant segment according to the previous rule. In the same time it requests the missing part of the unfinished segment from the server.

After every successful or unsuccessful segment upload, the data about the gain and the estimation of the uploaders are updated. Later the SBC uses this information. The pseudo-code of the SSA algorithm is shown in Algorithm 1.

---
Algorithm 1 Segment Selector Algorithm (SSA)
---
if segment.playback_done then
  gain.udate( ) //gain decreased
end if
if server.segment_ready then
  gain.update( ) //gain increased
  if (missing segment in $t_S$) then
    s ← the missing segment; i ← the client uploading s;
    server.get(s)
    if (i≠NIL) then
      client[i].stop( );client[i].getnewsegment(after $t_C$);
    end if
  else
    server.getnewsegment(after $t_S$)
  end if
end if
if client[i].segment_ready then
  gain.update( )
  client[i].est.update( ) // estimate the client degment upload time
end if
---

The pseudo code of the SSA method is shown in Algorithm 1.

The different steps could be interpreted as follows:

If the playback of a segment finishes, then obviously the next segment is started. The segment is taken from the buffer, i.e. the gain is decreased by one segment.

If the server finishes the upload of a segment, then the SCU has one more segment in the buffer, so the gain is increased by 1. Then the SCU checks if there are still missing segments in the t_S region (the "critical" region which will be needed so soon that it cannot be left to unreliable peers). If there is such a segment, denote it by s, then start to download this segment from the server (which is expected to reliably finish in time). If this server was being downloaded from a peer beforehand, then obviously it is necessary to stop this peer, and instead the SCU will select another distant segment (after the t_C period) to try to upload. If there was no missing segment in t_S, then the server can upload a segment that is after t_S.

If a peer i finishes a segment upload, then there is one more segment in the buffer so the gain is increased. And since the algorithm requires an estimation of the average client upload speed (equivalent to segment upload time) for each client, the SCU can now re-estimate the upload speed of client i.

Setting the parameter t_C ($t_c$) and t_S ($t_s$):

Let t_C be the maximum of number N_C last completely finished client segment upload times at any position of the playback. A typical value for N_C is 10.

t_S should be defined by the time that is needed for the server to upload a number of N_S segments. Practically it is set to 2 or 3.

SSA guarantees the fault free playback and minimizes the losses in the cases of the video recording and playback (VCR) operations.

Server Bandwidth Control

The SSB is handled by the SSB block. There are two governing principles in the design of SBC shown in Algorithm 2. The first is to find the minimal attainable server speed. The second one is to avoid that the sum of the server upload speed and the client upload speeds exceeds the reserved bandwidth at the client downlink. Otherwise, a segment that has to be downloaded from the server with very high speed because of its close deadline can not be downloaded because concurrent downloads from other clients may decrease the available server speed. On the other hand, we want to utilize the maximal upload capacities of the uploaders so in a competitive situation the uploaders can not upload at the highest speed. Therefore, it is better to dismiss some of them so that (1) our client gets the needed bandwidth (2) the uploaders could upload at the maximal upload speed.

Using the information which was gathered by the SSA about the clients' upload speeds, SBC estimates their maximal upload bandwidth and other behaviour properties to determine the upper bound and the optimal server speed. SBC calculates the lower bound as a function of the gain. More details of these bandwidths are given in the following subsections.

---
Algorithm 2 Server Bandwidth Control (SBC)
---
if gain.changed( ) or any client[i].est.changed( ) then
  $\sigma_{opt}$ = OptServSpeedAlg(gain; all.client.est.segment.uploadtime)
  $\sigma_{min} = \max_{time_t \leq t_C} \frac{gap_1 + \ldots + gap_t}{time_t}$
  $\sigma_{max} = V_{max} - \Sigma\text{estimated\_maximal\_uploadspeed}$
  $\sigma = \min \{\max\{\sigma_{min}, \sigma_{opt}\}, \sigma_{max}\}$
  $t_C$ ← maximum of some last upload times
end if
if $\sigma_{max} < \sigma_{min}$ then
  remove client with max upload speed
end if
if client[new] is available and
      $\sigma_{max} - \sigma >$ client[new].est.uploadspeed( ) then
  accept client[new]
end if
---

The pseudo code for the SBC method is shown above in algorithm 2. SBC results the minimal server bandwidth while guarantees the fault free playback and competition free downloads. Additionally it implicates the maximal exploitation of the upload bandwidths by the uploader management.

This main task of this one is to control the actual speed that should be used by the server, denoted by sigma.

The speed can be updated whenever the gain has changed or if a client upload speed has been re-estimated. The server speed, sigma, is calculated with some helping variables (denoted by sigma_max, sigma_min, sigma_opt), which are calculated beforehand.

Now, if sigma_min was higher than sigma_max, this would mean that there is a race condition in the network, and the parallel uploads would compete, which could impact the server upload. So in order to avoid this, it's necessary to "kill" or remove a peer from the uploaders in order to free up some bandwidth that can be used by the server.

If the tracker reports that a new uploader peer could come to help our downloader STB, then it is verified if there is some free bandwidth that could be used by the new peer. If there is (sigma_max is bigger than the actual server speed), then the peer can be accepted.

The different steps of the algorithm are further described in the next.

Lower Bound Algorithm

Figure 5:
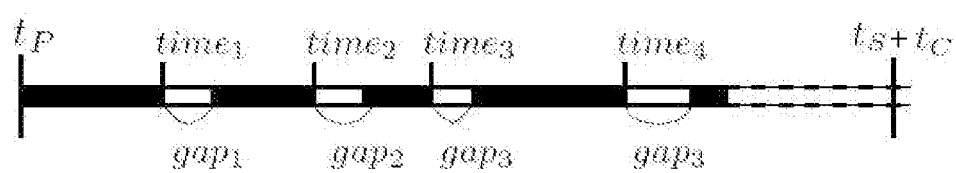
FIG. 5 is illustrating a time axis comprising existing and missing video segments in time order of a video session, such as a movie, in the buffer storage.

With reference to FIG. 5, the lower bound algorithm will now be discussed and explained. FIG. 5 comprises a time axis illustrating existing and missing video segments in time order of a video session, such as a movie, in the buffer storage.

This algorithm tells the minimal server speed that is needed for the fault free playback. Anytime during the playback the prebuffered gain may contain gaps, that is, parts of the video that are not downloaded at the time of the playback. Formally, from the actual position of the playback t_p and before the parameter t_S+t_C ($t_s+t_c$ in FIG. 5) there is a time1 long continuous gain [t_p,t_p+time1]. After time1 the length of the missing part is gap1. After gap1 the next missing part starts from the time2 and its length is gap2, and so on. A gap is a continuous portion of the stream in t_S+t_C where no segments are available, i.e. where no segments have been downloaded yet. Gapi is defined as the "i:th continuous undownloaded portion of the stream within t_S+t_C. Timei denotes the beginning of gapi.

To download the first missing part gap1 until its playback the server has to stream at least at speed [gap1/time1]. Similarly, provided the first missing part has been already downloaded then for downloading the first two missing parts with length gap1+gap2 we have time2 long time, so the minimal server speed has to be the maximum of [gap1/time1] and [(gap1+gap2)/time2], and so on. Therefore, the minimal server speed $\sigma_{min}$(sigma_min) at playback time is $$\sigma_{min} = \max_{time_i \leq t_c} \left\{ \frac{gap1 + \ldots gapi}{time_i} \right\} \qquad \text{Equation 1}$$

The most accurate computation for sigma_min would be the following. Any segments which are currently under download either from the server or the clients are tracked. In this case the meaning of gaps is the remaining part of the segments being downloaded or the segments not yet downloaded. If the tracking of all download streams is not feasible (e.g. due to the downloader client's STB is not capable of that) then one can estimate the gaps. For example, the downloaded part of the first segment before the playback time is precisely tracked and the other segments that are under download are considered to have downloaded completely.

The Equation 1. bound determines the minimal server bandwidth to avoiding the break in the playback.

Upper Bound Calculation

To avoid the competition at the downlink the following simple algorithm determines the upper bound of the server speed. Estimate a maximal bandwidth for each uploader from them last upload times. The upper bound for the available server speed is simply equal the difference of Vmax and sum of the uploaders' estimated maximal bandwidth. The upper bound results the competition free download.

Optimal Bandwidth

The computation of the optimal server bandwidth is based on a probabilistic formula that relates to the
1) server speed,
2) the prebuffered gain and
3) the play-back fault probability if the uploaders' segment upload time distributions are given. The stochastic background was described in the paper [1] which has been presented at INFOCOM 2009.

Using this relation one can determine the optimal server bandwidth if the prebuffered initial gain and the segment upload time distribution of all uploader are known and the probability of any play back fault in the next hours (i.e. long enough period compared to the video size) is fixed. The upload distributions are estimated from previous segment upload times for each uploader.

Practically, a decision table is prepared that is uploaded to each SCU. The SCUs set the required server download bandwidth using this table. More precisely, in this table the required server bandwidths are shown as a function of the size of the prebuffered gain and all possible segment upload times of all possible number of uploaders.

The optimal server speed should be chosen as long as it is between the lower and upper bound. If the optimal speed is out of the bounds, the closest bound is chosen as the best choice.

Uploader Management

If the upper bound is less than the lower bound, we have to disjoint an uploader as long upper bound is less than lower bound. To get higher server bandwidth we suggest choosing the fastest ones.

Accept a new uploader if the necessary gain for the fault free playback is collected and the difference between the minimal and the attainable maximal server speed (sigma_max–sigma) is larger than the new uploader's average upload speed.

Video Recording and Playback Operations

Although it is the consequence of the previous algorithms, it should be noticed that after any video recording and playback (VCR) operation using the previous algorithms is advised according the new set of gaps in the gain. For example after a forward jump if there aren't any segments after the time of playback, the server speed has to be the bitrate of the video, but after a backward jumping where the customer has the all segment the server bandwidth could be decreased.

Storage Policy

A peer-to-peer based VoD distribution system architecture assumes that peers, i.e. clients/SCUs, store downloaded movies in a data storage (304 in FIG. 3), such as a data buffer storage. Therefore, a storage policy block (322 in FIG. 3), even denoted storage deletion policy block, may be provided in the clients, i.e. the SCUs (see 300 in FIG. 1). It could be supposed that in the local storages either the whole video file or the part of the video file could be stored as far as the limited local storage capacity allows. If the client is running out of storage capacity, it has to decide what to delete. From the above model it is straightforward that deleting a whole video would be a wrong policy when storage space is needed. A more intelligent policy deletes segments from a movie so that there still remain segments from the movie scattered in a uniform manner throughout the movie.

The average upload capacity of a client needing to free up some storage space is denoted by u. With this, it is easy to see that such an intelligent policy is useful until the available amount of segments compared to the whole movie is not below [video bitrate/u]. As an uploader client in average can only upload every [video bitrate/u]:th segment from a movie it is enough to store every [video bitrate/u]:th segment of the given movie to be an efficient uploader. Consequently, in the case when more segments should be deleted the best choice is to delete the whole movie.

Upload Bandwidth Sharing

Another issue is the upload bandwidth sharing. It is easy to see that if the client/SCU has low upstream bandwidth capacity compared to the video bitrate then it should not divide its upload capacity between more clients, since the upload of a segment to only one client finishes earlier.

If, however, the upload capacity is close to the bitrate of the video, then it is advisable to share the upload bandwidth among several downloader clients because in this way the variance of the upload length can be significantly decreased.

In practice if the upload capacity is bigger then the difference between the bitrate of the movie and the service download speed ($u > V_{max} - rho$) then upload sharing is necessary otherwise the customer can't accept uploaders because at the beginning the value of sigma is equal to rho.

CONCLUSION

The present invention comprising the above disclosed algorithms and solutions provides the following positive features:
- enablement of video recording and playback (trick-play) operation;
- a specification of how an uploader client driven video service tracker policy should work to keep the operational cost low and efficiency high;
- a decision policy when the uploader client can split upload bandwidth between downloaders;
- determination from where to acquire a specific video segment, i.e. from the server or from the associated clients;
- determination of the optimal prebuffered gain that aimed to balance the instable speed of uploader client;
- maximizing of the time an uploader client can continuously upload segments for its downloader clients;
- an enablement of maximal utilisation of upload potential of clients; This issue incorporates:
  - an uploader kick-off policy from the set of uploaders associated to a specific client;
  - an uploader admittance policy that determines when a client should admit a new uploader client;
- an eligibility criteria for efficient uploaders;
- a deletion policy from local storage of clients when storage is overfilled;
- a limitation of the playback failure probability; and so
- optimise the server speed, where optimum is defined as the smallest possible such that the playback is not failed with a predefined probability during an interval in advance of the actual position of the playback. The length of this interval is also predefined.

Over the above mentioned architecture (central server, service manager and customer SCUs, e.g. set top boxes), the proposed video service provisioning system provides an optimal peer allocation and segment selection architecture and algorithms that utilize the available storage capacities at the customers and free uplink capacities in the access and aggregation networks reducing the central server load, with respect to the quality of the offered service.

Thus a system architecture for downloading of video segments and video streams from video segment providers are provided. An embodiment of such a system is illustrated in FIG. 1. Said system is comprising at least one central video server 102 providing video uploading services to a plurality of subscriber client units 104 and at least one subscriber client unit 104 being a possible or accepted/allowed uploader client unit providing video uploading services to other clients (104) in a peer-to-peer manner. The system is characterized in that it comprises at least one Subscriber Client Unit SCU 104 according to the claimed invention.

The invention may be implemented in digital electronically circuitry, or in computer hardware, firmware, software, or in combinations of them. Apparatus of the invention may be implemented in a computer program product tangibly embodied in a machine readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor, such as the control unit (302 in FIG. 3) coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially-designed ASICs (Application Specific Integrated Circuits).

A number of embodiments of the present invention have been described. It will be understood that various modifications may be made without departing from the scope of the invention. Therefore, other implementations are within the scope of the following claims defining the invention.

REFERENCES

A. Kőrösi, B. Székely, Cs. Lukovszki, A. Császár. High quality P2P-Video-on-Demand with download bandwidth limitation. *IWQoS* 2009]

The invention claimed is:

1. Method performed by a subscriber client unit for controlling a downloading of video segments or a segmented video stream to the subscriber client unit from providers comprising at least one central video server providing video uploading services to a plurality of subscriber clients and at least one subscriber client being a possible and/or accepted uploader client providing video uploading services to other clients in a peer-to-peer manner, the subscriber client unit being capable of executing a Segment Selector Algorithm for selecting from a list of accepted available video providers a suitable provider for a succeeding video segment to be downloaded, and a Server Bandwidth Control (SBC) algorithm, the method comprising:
  calculating a minimal server bandwidth ($\sigma_{min}$) according to a prebuffered video segment gain in the subscriber client unit in order to achieve a fault free playback;
  calculating a maximal server bandwidth ($\sigma_{max}$) according to a number of available uploader clients' upload bandwidth in order to avoid competition on a subscriber's access link;
  determining an optimal server bandwidth ($\sigma_{opt}$) according to estimated upload clients' behaviours; and determining and setting a server speed (σ) based on the minimal server bandwidth ($\sigma_{min}$), the maximal server bandwidth ($\sigma_{max}$) and the determined optimal max, server bandwidth ($\sigma_{opt}$).

2. The method according to claim 1, wherein the determining and setting the server speed (σ) comprises estimating the server speed as $$\sigma=\min\{\max\{\sigma_{min},\sigma_{opt}\},\sigma_{max}\}.$$

3. The method according to claim 1, wherein the optimal server bandwidth ($\sigma_{opt}$) is determined based on the prebuffered video segment gain, possible values for uploaders' segment upload times and a target play-back fault probability.

4. The method according to claim 1, wherein the minimal server bandwidth ($\sigma_{min}$) speed is calculated as $$\sigma_{min} = \max_{time_i \leq t_C} \left\{ \frac{gap1 + \ldots \, gapi}{time_i} \right\}$$

wherein, gapi is the i:th continuous un-downloaded portion of a stream within t_S+t_C, where t_C is a time offset after which a segment download can start from another client and t_S is a time for downloading all currently requested segments, and time denotes a beginning of gapi, for estimating a minimal server bandwidth ($\sigma_{min}$) speed.

5. The method according to claim 1, wherein the maximal server bandwidth ($\sigma_{max}$) is calculated as $$\sigma_{max}=V_{max}-\Sigma\text{estimated\_maximal\_uploadspeed}$$

wherein $V_{max}$ is the downlink bandwidth reserved for the video service at the subscriber's access link, and Σestimated_maximal_uploadspeed is a total bandwidth/speed of available uploader clients' upload bandwidth/speeds.

6. The method according to claim 1, further comprising determining using the minimal server bandwidth ($\sigma_{min}$) and the maximal server bandwidth ($\sigma_{max}$) whether a list of accepted available video providers should be changed, or not.

7. The method according to claim 6, wherein the list of accepted available video providers is to be changed by dropping an accepted available uploader client if $$\sigma_{max} \leq \sigma_{min}.$$

8. The method according to claim 1, further comprising updating a parameter t_C, which is a time offset after which a segment download can start from another client, based on an estimated upload of a segment, an estimation thereof being performed based on a preset number of recent completely finished video segment uploads.

9. The method according to claim 1, further comprising comparing an uploading speed ($\sigma_{new}$) of an uploader client candidate with a difference between the maximal server bandwidth ($\sigma_{max}$) and the determined server speed (σ) to determine whether the uploader client candidate is acceptable, or not.

10. The method according to claim 9, wherein the uploader client candidate is determined to be acceptable if $$\sigma_{max}-\sigma \geq \sigma_{new}.$$

11. The method according to claim 1 further comprising a storage policy process for determining whether a whole video file, a part of the video file or nothing of the video file should be stored depending on availability on a local storage capacity.

12. The method according to claim 11, wherein, according to said storage policy process, every k:th segment of a given video file is stored, wherein k is calculated as $$k=[\text{video bitrate}/u],$$

the video bitrate being a video file encoding rate and u being an average upload capacity of a subscriber client unit.

13. A subscriber client unit configured to control a downloading of video segments and video streams from video segment providers comprising at least one video server centre providing video uploading services to a plurality of subscriber clients and at least one subscriber client being a possible and/or accepted uploader client providing video uploading services to other clients in a peer-to-peer manner, the subscriber client unit comprising:

a controlling unit including a processor and configured
  to execute a Segment Selector Algorithm (SSA) for selecting a suitable provider for a succeeding video segment to be downloaded, from a list of accepted available video providers, and
  to execute a Server Bandwidth Control (SBC) Algorithm, the SBC Algorithm comprising
    first calculating unit configured to calculate calculating a minimal server bandwidth ($\sigma_{min}$) according to a prebuffered video segment gain in the subscriber client unit in order to achieve a fault free playback,
    estimating a maximal server bandwidth ($\sigma_{max}$) according to a number of available uploader clients' upload bandwidth in order to avoid competition on a subscriber's access link,
    determining an optimal server bandwidth ($\sigma_{opt}$) based on the prebuffered video segment gain and segment upload times, and
    determining and setting a server speed (σ) based on the minimal server bandwidth ($\sigma_{min}$), the maximal server bandwidth ($\sigma_{max}$) and the determined optimal server bandwidth ($\sigma_{opt}$).

14. The subscriber client unit according to claim 13, wherein the server speed is determined as $$\sigma=\min\{\max\{\sigma_{min}\},\sigma_{max}\}.$$

15. The subscriber client unit according to claim 13, wherein the optimal server band bandwidth ($\sigma_{opt}$) is determined based on the prebuffered video segment gain, possible values for uploaders' segment upload times and a target play-back fault probability.

16. The subscriber client unit according to claim 13, wherein the minimal server bandwidth is calculated as $$\sigma_{min} = \max_{time_i \leq t_C} \left\{ \frac{gap1 + \ldots \, gapi}{time_i} \right\}$$

wherein gapi is the i:th continuous undownloaded portion of a stream within t_S+t_C, where t_C is a time offset after which a segment download can start from another client and t_S is a time for downloading all currently requested segments, and $time_i$ denotes a beginning of gapi, for estimating a minimal server bandwidth ($\sigma_{min}$) speed.

17. The subscriber client unit according to claim 13, wherein the maximal server bandwidth ($\sigma_{max}$) is calculated as $$\sigma_{max}=V_{max}-\Sigma\text{estimated\_maximal\_uploadspeed}$$

wherein $V_{max}$ is the downlink bandwidth reserved for the video service at the subscriber's access link, and Σestimated_maximal_uploadspeed is a total bandwidth/speed of available uploader clients' upload bandwidth/speeds.

18. The subscriber client unit according to claim 13, wherein the controlling unit is further configured to determine whether a list of accepted available video providers should be changed, or not, using the minimal server bandwidth ($\sigma_{min}$), and the maximal server bandwidth ($\sigma_{max}$).

19. The subscriber client unit according to claim 18, wherein the controlling unit determines that the list of available video providers is to be changed by dropping an accepted available uploader client if $$\sigma_{max} \leq \sigma_{min}.$$

20. The subscriber client unit according to claim 13, wherein the controlling unit is further configured to update a parameter t_C, which is a time offset after which a segment download can start from another client, based on an estimated upload of a segment, an estimation thereof being performed based on a preset number of recent completely finished video segment uploads.

21. The subscriber client unit according to claim 13, wherein the controlling unit is further configured to compare the uploading speed ($\sigma_{new}$) of an uploader client candidate with a difference between the maximal server bandwidth ($\sigma_{max}$) and the determined server speed ($\sigma$) to determine whether the uploader client candidate is acceptable, or not.

22. The subscriber client unit according to claim 21, wherein the controlling unit determines that the uploader client candidate is acceptable if $$\sigma_{max} - \sigma \leq (\sigma_{new}).$$

23. The subscriber client unit according to claim 13, wherein the controlling unit is further configured to determine whether a whole video file, a part of the video file or nothing of the video file should be stored depending on availability on a local storage capacity.

24. The subscriber client unit according to claim 23, wherein said controlling controls a local storage to store every k:th segment of a given video file, wherein k is calculated as $$k = \lceil \text{video bitrate}/u \rceil$$

video bitrate being a video file encoding rate, and u being an average upload capacity of the subscriber client unit.

* * * * *